US010402724B2

(12) United States Patent
Kim et al.

(10) Patent No.: US 10,402,724 B2
(45) Date of Patent: Sep. 3, 2019

(54) METHOD FOR ACQUIRING A PSEUDO-3D BOX FROM A 2D BOUNDING BOX BY REGRESSION ANALYSIS AND LEARNING DEVICE AND TESTING DEVICE USING THE SAME

(71) Applicant: StradVision, Inc., Gyeongsangbuk-do (KR)

(72) Inventors: Yongjoong Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 15/723,538

(22) Filed: Oct. 3, 2017

(65) Prior Publication Data

US 2019/0102677 A1    Apr. 4, 2019

(51) Int. Cl.
*G06T 7/13*    (2017.01)
*G06N 3/08*    (2006.01)
(Continued)

(52) U.S. Cl.
CPC ......... *G06N 3/084* (2013.01); *G06K 9/00805* (2013.01); *G06T 7/13* (2017.01);
(Continued)

(58) Field of Classification Search
CPC .......... G06N 3/084; G06T 7/181; G06T 7/73; G06T 2207/10028; G06F 17/30256
See application file for complete search history.

(56) References Cited

U.S. PATENT DOCUMENTS

| 2015/0117709 A1* | 4/2015 | Chandraker | ....... G06K 9/00791 |
| | | | 382/103 |
| 2018/0137642 A1* | 5/2018 | Malisiewicz | ............. G06T 7/11 |

(Continued)

OTHER PUBLICATIONS

Arsalan Mousavian, Dragomir Anguelov, John Flynn, and Jana Kosecka, "3D Bounding Box Estimation Using Deep Learning and Geometry", Apr. 10, 2017, arXiv—Cornell University Library, https://arxiv.org/abs/1612.00496, pp. 1-10.*

(Continued)

*Primary Examiner* — Kamran Afshar
*Assistant Examiner* — Ying Yu Chen
(74) *Attorney, Agent, or Firm* — Xsensus LLP (57) ABSTRACT

A method for acquiring a pseudo-3D box from a 2D bounding box in a training image is provided. The method includes steps of: (a) a computing device acquiring the training image including an object bounded by the 2D bounding box; (b) the computing device performing (i) a process of classifying a pseudo-3D orientation of the object, by referring to information on probabilities corresponding to respective patterns of pseudo-3D orientation and (ii) a process of acquiring 2D coordinates of vertices of the pseudo-3D box by using regression analysis; and (c) the computing device adjusting parameters thereof by backpropagating loss information determined by referring to at least one of (i) differences between the acquired 2D coordinates of the vertices of the pseudo-3D box and 2D coordinates of ground truth corresponding to the pseudo-3D box, and (ii) differences between the classified pseudo-3D orientation and ground truth corresponding to the pseudo-3D orientation.

13 Claims, 7 Drawing Sheets

(51) Int. Cl.
G06T 7/73 (2017.01)
G06T 7/181 (2017.01)
G06T 17/10 (2006.01)
G06K 9/00 (2006.01)

(52) U.S. Cl.
CPC .............. *G06T 7/181* (2017.01); *G06T 7/73* (2017.01); *G06T 17/10* (2013.01); *G06T 2207/20084* (2013.01)

(56) References Cited

U.S. PATENT DOCUMENTS

2018/0137644 A1* 5/2018 Rad ........................... G06T 7/73
2018/0268601 A1* 9/2018 Rad ....................... G06T 15/205

OTHER PUBLICATIONS

Debidatta Dwibedi, Tomasz Malisiewicz, Vijay Badrinarayanan, and Andrew Rabinovich, "Deep Cuboid Detection: Beyond 2D Bounding Boxes", Nov. 30, 2016, arXiv—Cornell University Library, https://arxiv.org/abs/1611.10010, pp. 1-11.*

Xiaozhi Chen, Huimin Ma, Ji Wan, Bo Li, Tian Xia, "Multi-View 3D Object Detection Network for Autonomous Driving", Jun. 22, 2017, arXiv—Cornell University Library, https://arxiv.org/abs/1611.07759, pp. 1-9.*

David G. Lowe, "Local Feature View Clustering for 3D Object Recognition", 2001, Computer Vision and Pattern Recognition, 2001. CVPR 2001. Proceedings of the 2001 IEEE Computer Society Conference on, pp. 682-688.*

Bo Li, Tianlei Zhang and Tian Xia, "Vehicle Detection from 3D Lidar Using Fully Convolutional Network", Aug. 29, 2016, arXiv—Cornell University Library, https://arxiv.org/abs/1608.07916, pp. 1-8.*

Mahdi Rad et al, "BB8: A Scalable, Accurate, Robust to Partial Occlusion Method for Predicting the 3D Poses of Challenging Objects Without Using Depth", Institute for Computer Graphics and Vision Graz University of Technology, Austria, Mar. 31, 2017, 9 pages.

Arsalan Mousavian et al., "3D Bounding Box Estimation Using Deep Learning and Geometry" George Mason University, Dec. 1, 2016, 9 pages.

Debidatta Dwibedi et al., Deep Cuboid Detection: Beyond 2D Bounding Boxes, Carnegie Mellon University, Nov. 30, 2016, 11 pages.

* cited by examiner

METHOD FOR ACQUIRING A PSEUDO-3D BOX FROM A 2D BOUNDING BOX BY REGRESSION ANALYSIS AND LEARNING DEVICE AND TESTING DEVICE USING THE SAME

FIELD OF THE INVENTION

The present invention relates to a method for acquiring a pseudo-3d box from a 2d bounding box by regression analysis and a learning device and a testing device using the same; and more particularly, to the method for acquiring the pseudo-3D box from the 2D bounding box in a training image, including steps of: (a) acquiring the training image including an object bounded by the 2D bounding box; (b) performing (i) a process of classifying a pseudo-3D orientation of the object, by referring to information on probabilities corresponding to respective patterns of pseudo-3D orientation and (ii) a process of acquiring 2D coordinates of vertices of the pseudo-3D box by using regression analysis; and (c) adjusting parameters of a CNN by backpropagating loss information determined by referring to at least one of (i) differences between the acquired 2D coordinates of the vertices of the pseudo-3D box and 2D coordinates of ground truth corresponding to the pseudo-3D box, and (ii) differences between the classified pseudo-3D orientation and ground truth corresponding to the pseudo-3D orientation and the learning device and the testing device using the same.

BACKGROUND OF THE INVENTION

An autonomous car is a vehicle that is capable of sensing its environment and navigating without human input. Autonomous cars use a variety of techniques to detect their surroundings, such as radar, laser light, GPS, odometry, and computer vision.

Estimating three-dimensional (3D) information from two-dimensional (2D) monocular images by using the computer vision is an important task in applications such as autonomous driving and personal robotics. In general, a 2D box for bounding an object in an image is created and then a 3D model is constructed from the 2D box.

To find the 2D box for bounding an object, conventional technologies used template-based method in general. One of the conventional methods for creating the 2D box is a sliding windows method. The method slides a window-like box repeatedly over a whole image with varying scales and detects each object inside the window-like box. That is, as the objects in the image can be of very different sizes or scales, the image is scaled down several times and the window-like box is slid over the image again to find the objects at different sizes.

One of other conventional methods is an anchor box method. In this method, various anchor boxes are centered at a certain position and an anchor box with the highest probability, e.g., the highest overlapping region with a ground truth object, among the various anchor boxes, is determined by using regression analysis.

Then, a 3D bounding box is constructed from the determined anchor box, however, there are limitations. First, the 3D bounding box may have six surfaces and three surfaces among the six surfaces may require exhaustive searches. Second, in case a single template is used for determining the three surfaces of the 3D bounding box, an accuracy may be low because boundary conditions of regression may vary as 3D orientation of the object changes. Third, conventional methods of acquiring the 3D bounding box require much computational resources. For example, matching a cuboid template or voxel for finding a 3D bounding box takes up a lot of computational time.

Thus, the present invention proposes a new method for removing such redundant computation and improving the accuracy of detection.

SUMMARY OF THE INVENTION

It is an object of the present invention to solve all the aforementioned problems.

It is another object of the present invention to simplify a 3D bounding box for circumscribing a 3D object by using a pseudo-3D box.

It is still another object of the present invention to reduce computational time and resources by using 2D coordinates of vertices of the pseudo-3D box.

In accordance with one aspect of the present invention, there is provided a method for acquiring a pseudo-3D box from a 2D bounding box in a training image, including steps of: (a) a learning device acquiring or supporting another device to acquire the training image including an object bounded by the 2D bounding box; (b) the learning device performing or supporting another device to perform (i) a process of classifying a pseudo-3D orientation of the object, by referring to information on probabilities corresponding to respective patterns of pseudo-3D orientation, and (ii) a process of acquiring 2D coordinates of vertices of the pseudo-3D box by using regression analysis; and (c) the learning device adjusting or supporting another device to adjust parameters thereof by backpropagating loss information determined by referring to at least one of (i) differences between the acquired 2D coordinates of the vertices of the pseudo-3D box and 2D coordinates of ground truth corresponding to the pseudo-3D box, and (ii) differences between the classified pseudo-3D orientation and ground truth corresponding to the pseudo-3D orientation.

In accordance with another aspect of the present invention, there is provided a method for acquiring a pseudo-3D box bounding an object in a test image, including steps of: (a) a testing device acquiring or supporting another device to acquire the test image including an object for testing bounded by a 2D bounding box for testing, on condition that (i) a learning device acquires or supports another device to acquire a training image including an object for training bounded by a 2D bounding box for training; (ii) the learning device performs or supports another device to perform (ii-1) a process of classifying a pseudo-3D orientation of the object for training, by referring to information on probabilities corresponding to respective patterns of pseudo-3D orientation, and (ii-2) a process of acquiring 2D coordinates of vertices of the pseudo-3D box for training by using regression analysis; and (iii) the learning device adjusts or supports another device to adjust parameters thereof by backpropagating loss information determined by referring to at least one of (iii-1) differences between the acquired 2D coordinates of the vertices of the pseudo-3D box for training and 2D coordinates of ground truth corresponding to the pseudo-3D box for training, and (iii-2) differences between the classified pseudo-3D orientation for training and ground truth corresponding to the pseudo-3D orientation for training; (b) the testing device performing or supporting another device to perform (i) a process of classifying a pseudo-3D orientation of the object for testing, by referring to information on probabilities corresponding to respective patterns of pseudo-3D orientation and (ii) a process of acquiring 2D coordinates of vertices of the pseudo-3D box for testing by using the regression analysis.

In accordance with still another aspect of the present invention, there is provided a learning device for acquiring a pseudo-3D box from a 2D bounding box in a training image, including: a communication part for acquiring or supporting another device to acquire the training image including an object bounded by the 2D bounding box; and a processor for performing or supporting another device to perform (i) a process of classifying a pseudo-3D orientation of the object, by referring to information on probabilities corresponding to respective patterns of pseudo-3D orientation; (ii) a process of acquiring 2D coordinates of vertices of the pseudo-3D box by using regression analysis; and (iii) a process of adjusting parameters thereof by backpropagating loss information determined by referring to at least one of (iii-1) differences between the acquired 2D coordinates of the vertices of the pseudo-3D box and 2D coordinates of ground truth corresponding to the pseudo-3D box, and (iii-2) differences between the classified pseudo-3D orientation and ground truth corresponding to the pseudo-3D orientation.

In accordance with still yet another aspect of the present invention, there is provided a testing device for acquiring a pseudo-3D box bounding an object in a test image, including: a communication part for acquiring or supporting another device to acquire the test image including an object for testing bounded by a 2D bounding box for testing, on condition that (i) a learning device acquires or supports another device to acquire a training image including an object for training bounded by a 2D bounding box for training; (ii) the learning device performs or supports another device to perform (ii-1) a process of classifying a pseudo-3D orientation of the object for training, by referring to information on probabilities corresponding to respective patterns of pseudo-3D orientation and (ii-2) a process of acquiring 2D coordinates of vertices of the pseudo-3D box for training by using regression analysis; and (iii) the learning device adjusts or supports another device to adjust parameters thereof by backpropagating loss information determined by referring to at least one of (iii-1) differences between the acquired 2D coordinates of the vertices of the pseudo-3D box for training and 2D coordinates of ground truth corresponding to the pseudo-3D box for training, and (iii-2) differences between the classified pseudo-3D orientation for training and ground truth corresponding to the pseudo-3D orientation for training; and a processor for performing or supporting another device to perform (i) a process of classifying a pseudo-3D orientation of the object for testing, by referring to information on probabilities corresponding to respective patterns of pseudo-3D orientation and (ii) a process of acquiring 2D coordinates of vertices of the pseudo-3D box for testing by using the regression analysis.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
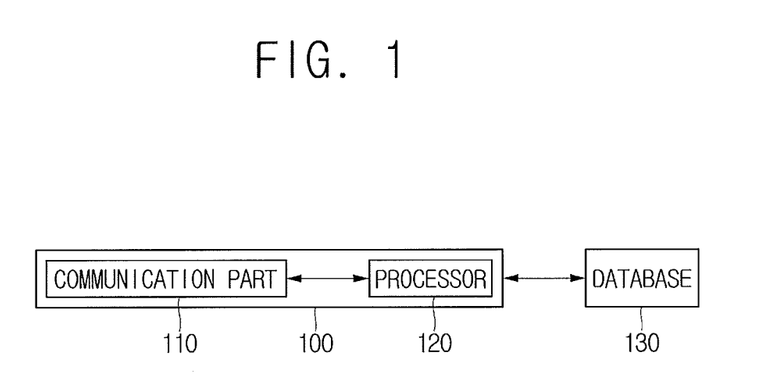
FIG. 1 is a diagram illustrating a configuration of a learning device for acquiring a pseudo-3D box from a 2D bounding box in a training image in accordance with one example embodiment of the present invention.

FIG. 1 is a diagram illustrating a configuration of a learning device 100 for acquiring a pseudo-3D box from a 2D bounding box in a training image including at least one object, in accordance with the present invention. Herein, the pseudo-3D box and the 2D bounding box may tightly bound the object. Further, the learning device 100 may be divided into several devices to perform its functions, however, the present specification describes the learning device 100 implemented as a single device for convenience. The learning device 100 in accordance with the present invention may include parts of a convolutional layer, a region proposal network (RPN), and a fully connected (FC) layer, etc.

By referring to FIG. 1, the learning device 100 for acquiring the pseudo-3D box from the 2D bounding box in the training image includes a communication part 110 and a processor 120. The learning device 100 may also include a database 130, although FIG. 1 shows the database 130 outside of the learning device 100.

The communication part 110 may transmit and receive data to and from external devices or among internal components. In particular, the communication part 110 may acquire the training image.

Figure 2:
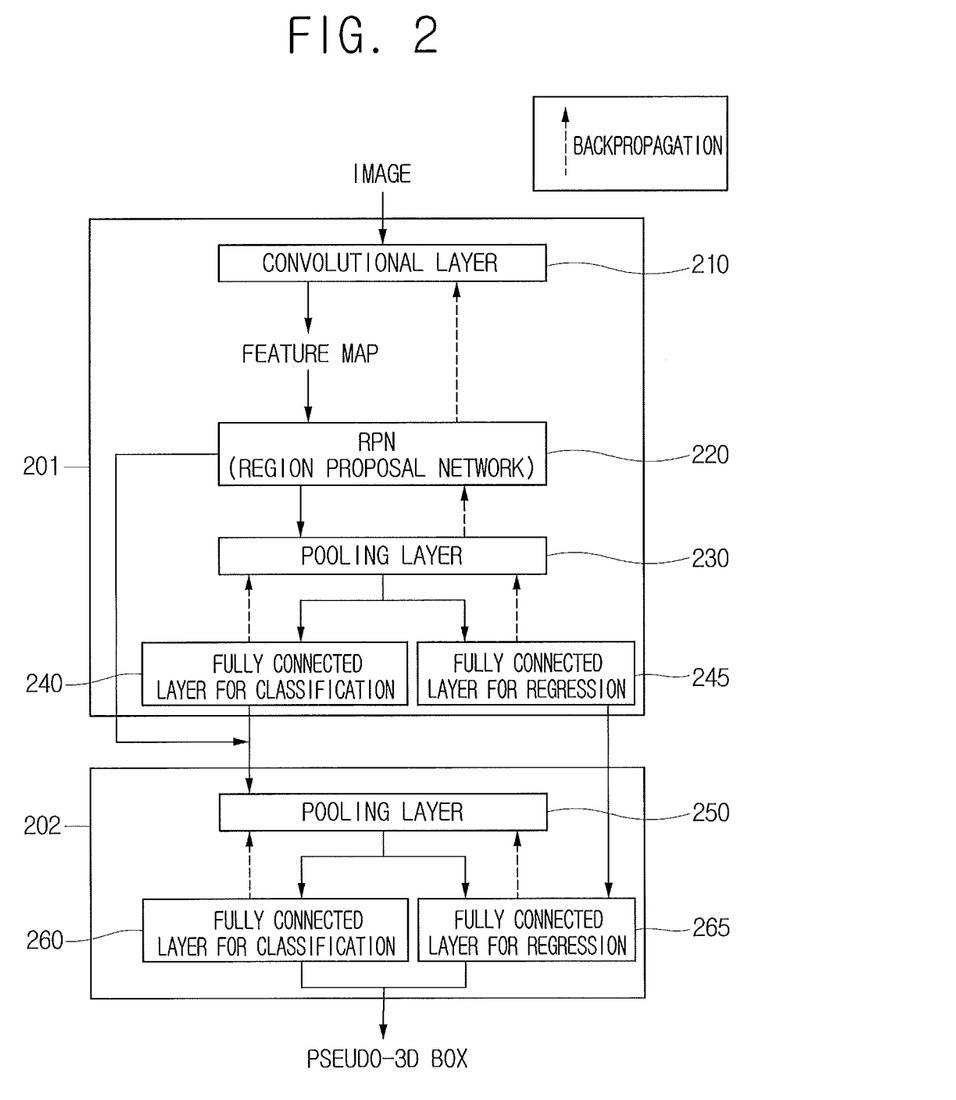
FIG. 2 is a diagram schematically illustrating a configuration of the learning device including a convolutional neural network (CNN) capable of acquiring the pseudo-3D box from a training image, in accordance with one example embodiment of the present invention.

FIG. 2 shows a configuration of the CNN included in the learning device 100 for acquiring a 2D bounding box and a pseudo-3D box. A first part 201 in the CNN is configured to acquire the 2D bounding box in the training image and a second part 202 in the CNN is configured to acquire the pseudo-3D box from the 2D bounding box.

The first part 201 may include a convolutional layer 210, an RPN 220, a pooling layer 230, and two FC layers 240 and 245. Herein, the convolutional layer 210 may create at least one feature map from the training image. Further, the FC layers 240 and 245 may perform object classification and box regression, respectively.

The second part 202 may include a pooling layer 250 and other two FC layers 260 and 265. Herein, the FC layers 260 and 265 may perform orientation classification and displacement regression, respectively.

As another example, the FC layers 240 and 245 may be implemented as a single FC layer, and the FC layers 260 and 265 may also be implemented as a single FC layer. The solid arrows may indicate downward flows and the dotted arrows may indicate upward flows of backpropagation.

By referring to FIG. 2, the training image may be inputted into the convolutional layer 210 then the feature map outputted therefrom may be inputted into the RPN 220. Then, information on region of interests (ROIs) on the training image may be outputted from the RPN 220. The information on ROIs may be fed into the pooling layer 230 in the first part 201 and the pooling layer 250 in the second part 202.

First, the pooling layer 230 may perform pooling, which may be a max pooling, and may output a pooled feature map which may be fed into the two FC layers 240 and 245. The FC layer 240 may output information on the object classification, e.g., information on whether the object is a vehicle, and the FC layer 245 may output information on the box regression with regard to the 2D bounding box, e.g., information on coordinates of vertices of the 2D bounding box.

Second, the input to be fed into the pooling layer 250 from the RPN 220 may be filtered by referring to a result of the FC layer 240, and then fed into the pooling layer 250.

That is, the input to be fed into the pooling layer 250 from the RPN 220 may be information on specific ROI selected among the information on ROIs. The information on specific ROI is selected by referring to information on a class, e.g., a vehicle, resulting from the FC layer 240.

The pooling layer 250 may perform an average pooling and its result may be fed into the two FC layers 260 and 265.

Meanwhile, the information on the box regression from the FC layer 245 in the first part 201 may be fed into the FC layer 265 in the second part 202.

Thus, the FC layer 260 may output information on the orientation classification, e.g., information on which pseudo-3D orientation the vehicle is facing, which is calculated by using information on an output of the pooling layer 250. Further, the FC layer 265 may output information on the displacement regression, e.g., information on 2D coordinates of vertices of the pseudo-3D box, which is calculated by using information on the output of the pooling layer 250 and information on the box regression with regard to the 2D bounding box acquired from the FC layer 245. These results from the FC layers 260 and 265 may be utilized to construct the pseudo-3D box.

Herein, the first part 201 may not be included in the learning device 100, as the case may be. That is, the first part 201 in another device may acquire the information on the 2D bounding box from the training image. Then, the learning device 100 may receive a training image (i.e., a so-called a revised training image) which already includes information on the 2D bounding box from said another device.

If this is the case, the second part 202 may include a convolutional layer (not shown), before the pooling layer 250, to acquire feature map to be inputted into the pooling layer 250. Further, the feature map inputted into the RPN 220 may be utilized by the pooling layer 250, but this is not a necessary condition.

Figure 3:
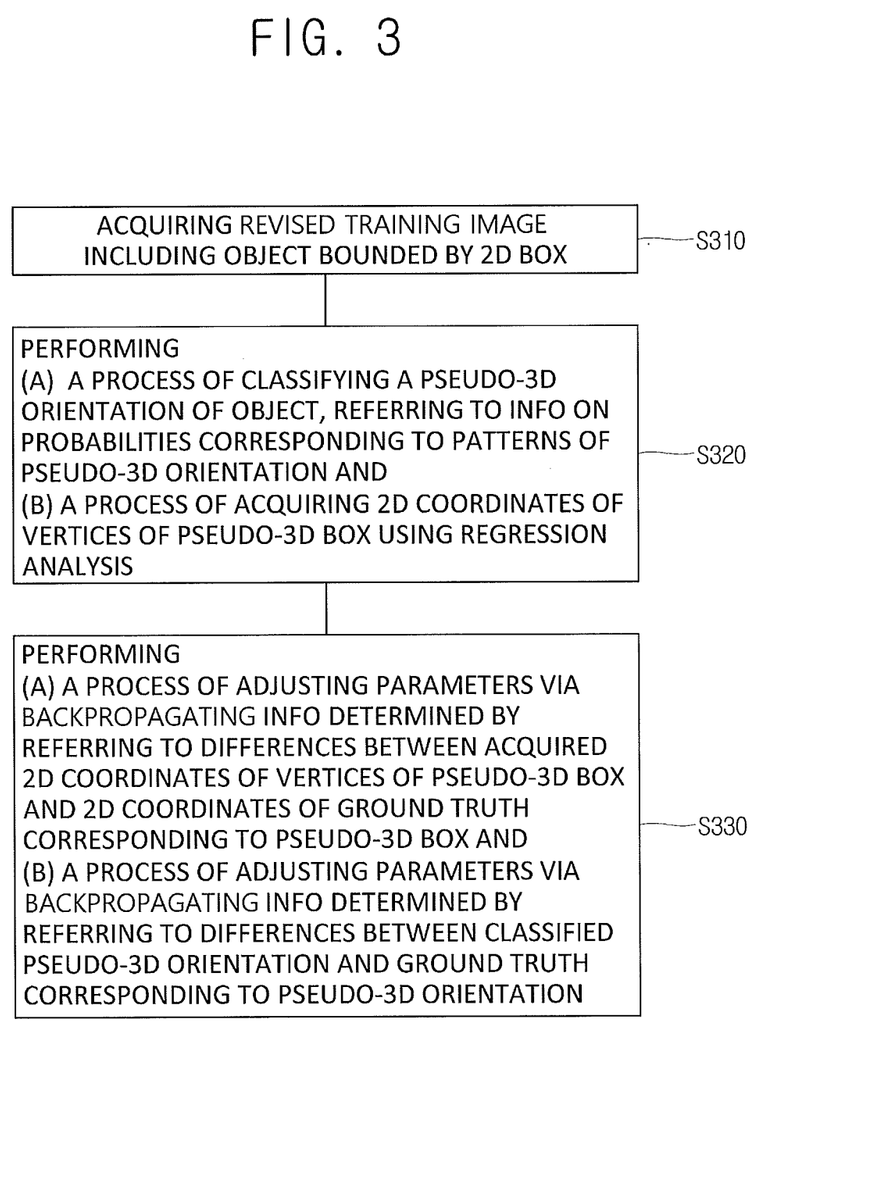
FIG. 3 is a diagram briefly illustrating a flow of the learning device acquiring the pseudo-3D box from the 2D bounding box in the training image in accordance with one example embodiment of the present invention.

FIG. 3 is a flowchart showing a flow of the learning device 100 acquiring the pseudo-3D box from the 2D bounding box in the training image in accordance with one example embodiment of the present invention.

As a first process, the communication part 110 acquires or supports another device to acquire the revised training image, i.e., the training image including the object bounded by the 2D bounding box, at the step of S310. The revised training image may include a whole image that has background as well as the object, or include a partial image that is cropped to only have the object inside the 2D bounding box.

As second processes, the processor 120 applies or supports another device to apply a convolutional operation to the revised training image to thereby acquire a feature map and then applies or supports another device to apply a pooling operation to the feature map to thereby acquire a pooled feature map. Thereafter, the pooled feature map is fed to the two FC layers 260 and 265 as mentioned above. For reference, the second processes are not shown in FIG. 3.

Figure 7:
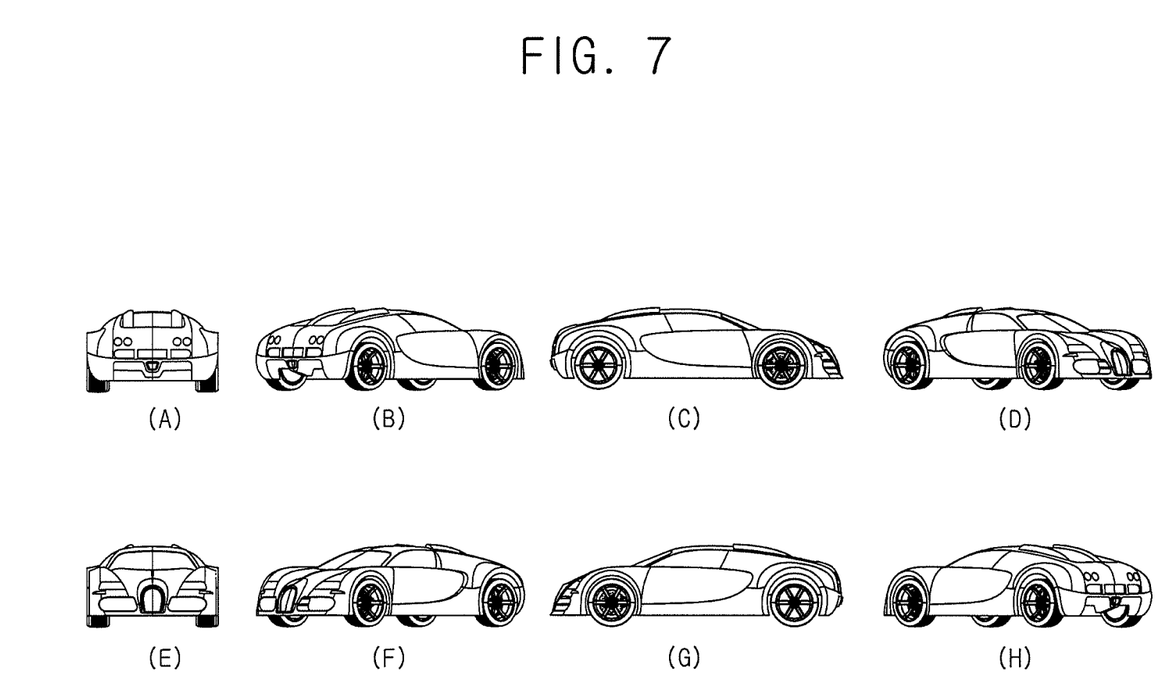
FIG. 7 is a diagram schematically illustrating patterns of pseudo-3D orientation of an object, e.g., a vehicle, used for estimation of probabilities corresponding to the patterns of the pseudo-3D orientation of the object in accordance with one example embodiment of the present invention.

As third processes, the processor 120 instructs the FC layer 260 to perform a process of classifying the pseudo-3D orientation of the object, by referring to information on estimated probabilities corresponding to respective patterns of the pseudo-3D orientation which are stored in the database 130, at the step (A) of S320. By referring to FIG. 7, these patterns may represent a rear face in case of (a), a rear face to the right in case of (b), a right face in case of (c), a front face to the right in case of (d), a front face in case of (e), a front face to the left in case of (f), a left face in case of (g), and a rear face to the left in case of (h) of the object, in this case, for example, the vehicle. For example, the vehicle in FIG. 4 may be classified as having a pattern of orientation corresponding to that of the front face to the right. Further, the processor 120 instructs the FC layer 265 to acquire information on 2D coordinates of vertices of the pseudo-3D box by using regression analysis, at the step (B) of S320. Herein, the regression analysis is performed for all of the patterns of the pseudo-3D orientation. Further, classifying the pseudo-3D orientation may be performed prior to acquiring the 2D coordinates of the vertices of the pseudo-3D box.

As fourth processes, the processor 120 adjusts or supports another device to adjust parameters of the CNN, by backpropagating loss information determined by referring to at least one of (i) differences between the acquired 2D coordinates of the vertices of the pseudo-3D box and 2D coordinates of ground truth corresponding to the pseudo-3D box and (ii) differences between the classified pseudo-3D orientation and orientation of ground truth corresponding to the pseudo-3D orientation, at the step of S330. Herein, the 2D coordinates of the ground truth corresponding to the pseudo-3D box may be 2D coordinates of vertices of a 3D box that is assumed to be tightly bounding the object. Further, the backpropagated information may include a loss which represents respective differences between (i) each of the patterns of the pseudo-3D orientation and its corresponding 2D coordinates calculated by using the regression analysis, and (ii) the pseudo-3D orientation and the 2D coordinates of the ground truth.

Figure 4:
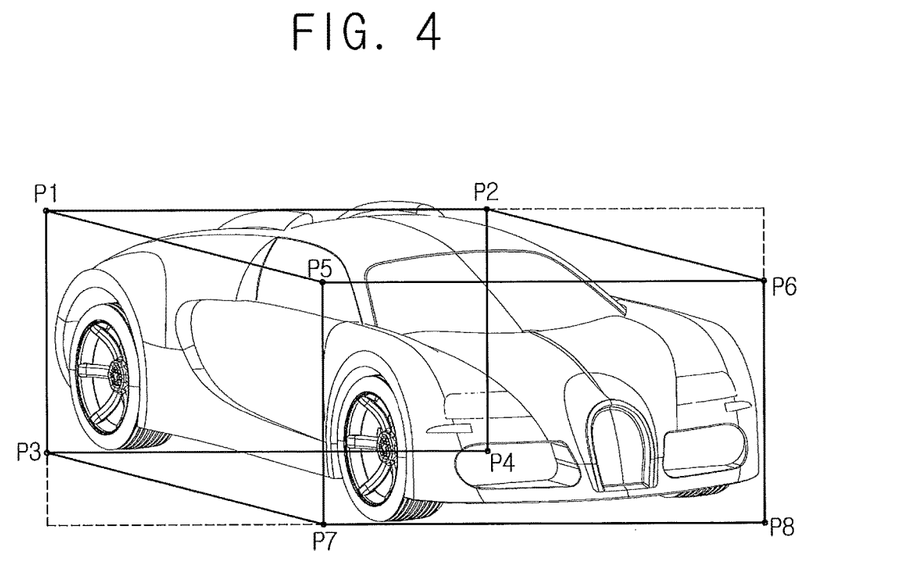
FIG. 4 is an illustration briefly showing a method of acquiring coordinates of vertices of the pseudo-3D box from the 2D bounding box in accordance with one example embodiment of the present invention.

FIG. 4 is an illustration briefly showing one method of acquisition of coordinates in accordance with one example embodiment of the present invention. FIG. 4 shows the 2D bounding box with dotted line which is tightly bounding the object and the pseudo-3D box with solid line that has vertices whose coordinates are to be acquired by the regression.

By referring to FIG. 4, the processor 120 performs or supports another device to perform a process of calculating respective displacements of the vertices of the pseudo-3D box from vertices of the 2D bounding box by using the regression analysis. Herein, information on difference between the vertices of the pseudo-3D box and the ground truth corresponding to the pseudo-3D box may be backpropagated to adjust the parameters of the CNN.

More specifically, the processor 120 determines or supports another device to determine a vertex V1 and its diagonal vertex V2 of the 2D bounding box as two vertices P1 and P8 of the pseudo-3D box. Then, the processor 120 calculates or supports another device to calculate the displacements of two vertices P4 and P5 (which are not in contact with a line segment that is shown as the dotted line of the 2D bounding box) from P1 and P8 using the regression analysis. Herein, the displacements may be parallel to the line segments of the 2D bounding box. The coordinates P4 and P5 may be calculated directly from the displacements from P1 and P8 respectively, and coordinates of remaining vertices P2, P3, P6, and P7 may be deduced from the coordinates of P4 and P5.

Figure 5:
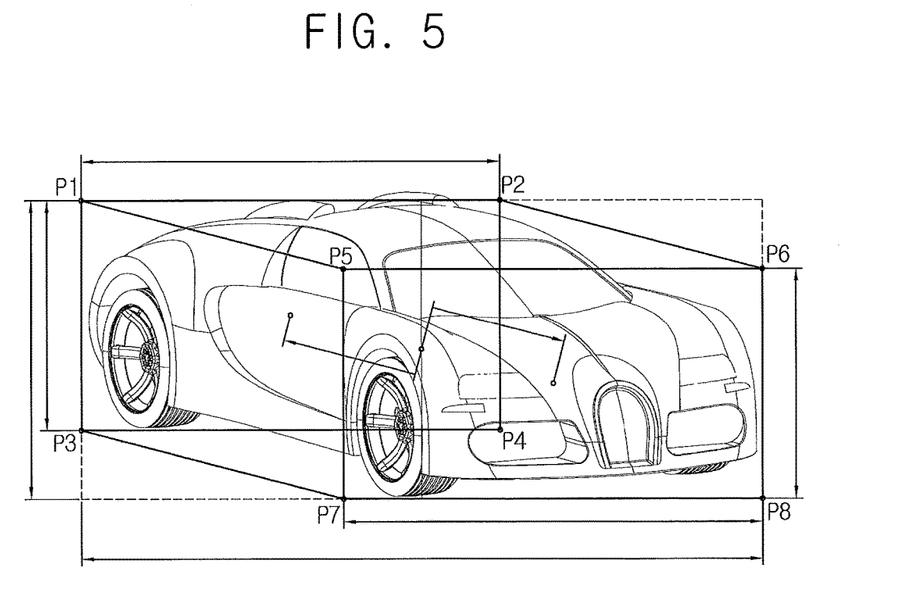
FIG. 5 is an illustration briefly showing another method of acquiring the coordinates of the vertices of the pseudo-3D box from the 2D bounding box in accordance with one example embodiment of the present invention.

FIG. 5 is an illustration briefly showing another method of the acquisition of the coordinates in accordance with one example embodiment of the present invention. FIG. 5 shows a center of the 2D bounding box, and two probable centers of a first target 2D box which corresponds to a first surface of the pseudo-3D box and of a second target 2D box which corresponds to a second surface which is antipodal to the first surface.

By referring to FIG. 5, the processor 120 performs or supports another device to perform a process of calculating a first vector from the center of the 2D bounding box to determine an end point of the first vector as a center of the first target 2D box, and a second vector from the center of the 2D bounding box to determine an end point of the second vector as a center of the second target 2D box. These two center points of two target 2D boxes are acquired by the regression analysis. The first target 2D box has P5, P6, P7, and P8 as vertices and the second target 2D box has P1, P2, P3, and P4 as vertices.

The processor 120 also performs or supports another device to perform a process of calculating ratios of a width of the first target 2D box to a width of the 2D bounding box, a width of the second target 2D box to the width of the 2D bounding box, a height of the first target 2D box to a height of the 2D bounding box, and a height of the second target 2D box to the height of the 2D bounding box. For example, the ratio of (i) the width of the first target 2D box represented by a bidirectional arrow from P7 to P8 to (ii) the width of the 2D bounding box represented by another longer bidirectional arrow, is acquired. These ratios may also be acquired by the regression analysis. The processor 120 further performs or supports another device to perform a process of calculating coordinates of P1, P2, P3, P4, P5, P6, P7, and P8 by referring to the displacements and the ratios. Herein, P1 is a vertex of the 2D bounding box and P8 is also a vertex of the 2D bounding box diagonal to the P1. Further, P4 and P5 are not in contact with the line segments of the 2D bounding box. That is, if the coordinates of P1, P4, P5, and P8 are known, it is trivial to deduce the coordinates of remaining vertices therefrom. Herein, information on difference between the vertices of the pseudo-3D box and the ground truth corresponding to the pseudo-3D box may also be backpropagated to adjust the parameters of the CNN.

Figure 6:
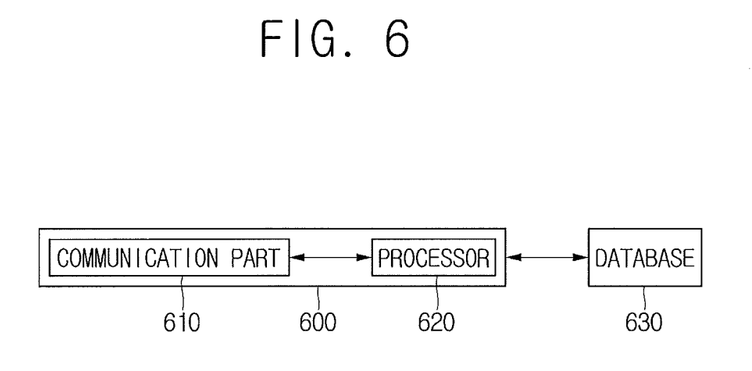
FIG. 6 is a diagram illustrating a configuration of a testing device for acquiring a pseudo-3D box from a 2D bounding box in a test image in accordance with another example embodiment of the present invention.

FIG. 6 shows a testing device for acquiring a pseudo-3D box from a 2D bounding box in a test image.

By referring to FIG. 6, the testing device 600 may include a communication part 610, a processor 620. The testing device 600 may also include a database 630, similar to the case of the database 130.

The testing device 600 may be divided into several devices to perform its functions, however, the present specification describes the testing device 600 implemented as a single device for convenience.

The testing device 600 in accordance with the present invention may include parts of the convolutional layer, the RPN, and the FC layer, etc.

Herein, an adjective phrase "for training" describes a conception used in explanation of the learning device 100, and is used in contraposition to "for testing" which is used in explanation of the testing device 600. The adjective phrase "for training" was omitted in the above explanation only for convenience.

In detail, the communication part 610 may acquire or support another device to acquire the test image including an object for testing bounded by a 2D bounding box for testing, on condition that (i) the learning device 100 acquires or supports another device to acquire the training image including the object for training bounded by the 2D bounding box for training; (ii) the learning device 100 performs or supports another device to perform (ii-1) a process of classifying the pseudo-3D orientation of the object for training, by referring to the information on probabilities corresponding to the respective patterns of the pseudo-3D orientation and (ii-2) a process of acquiring the 2D coordinates of the vertices of the pseudo-3D box for training by using the regression analysis; and (iii) the learning device 100 adjusts or supports another device to adjust the parameters thereof via backpropagating the information determined by referring to the (iii-1) differences between the acquired 2D coordinates of the vertices of the pseudo-3D box for training and the 2D coordinates of the ground truth corresponding to the pseudo-3D box for training, and (iii-2) the differences between the classified pseudo-3D orientation for training and the ground truth corresponding to the pseudo-3D orientation for training.

Further, the processor 620 may perform or support another device to perform (i) a process of classifying a pseudo-3D orientation of the object for testing, by referring to information on probabilities corresponding to respective patterns of pseudo-3D orientation and (ii) a process of acquiring 2D coordinates of vertices of the pseudo-3D box for testing, by using the regression analysis. Herein, the regression analysis on the 2D coordinates of vertices of the pseudo-3D box for testing may be performed only for one pattern of the pseudo-3D orientation.

The remaining processes are omitted, as the description is largely the same except the adjustment of the parameters by backpropagation that is unnecessary for testing.

In accordance with one aspect of the present invention, there is an effect of simplifying a 3D model for representing a 3D object.

In accordance with another aspect of the present invention, there is an effect of reducing consumption of computational time and resources by minimizing calculation needed for determining coordinates of vertices of bounding boxes.

In accordance with still another object of the present invention, there is an effect of providing a learning method for acquiring a 3D box to minimize human input.

Besides, the embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for acquiring a pseudo-3D box from a 2D bounding box in a training image, comprising steps of:
   (a) a learning device acquiring or supporting another device to acquire the training image including an object bounded by the 2D bounding box, the object being a vehicle, and the pseudo-3D box being configured to contain the object in an autonomous driving application;
   (b) the learning device performing or supporting another device to perform (i) a process of classifying a pseudo-3D orientation of the object, by referring to information on probabilities corresponding to respective patterns of pseudo-3D orientation, and (ii) a process of acquiring 2D coordinates of vertices of the pseudo-3D box, by using regression analysis; wherein the learning device performs or supports another device to perform a process of calculating respective displacements from vertices of the 2D bounding box by using the regression analysis; and
   (c) the learning device adjusting or supporting another device to adjust parameters thereof by backpropagating loss information determined by referring to at least one of (i) differences between the acquired 2D coordinates of the vertices of the pseudo-3D box and 2D coordinates of ground truth corresponding to the pseudo-3D box, and (ii) differences between the classified pseudo-3D orientation and ground truth corresponding to the pseudo-3D orientation,
   wherein the 2D coordinates define 2D coordinates of vertices of the pseudo-3D box, and
   at the process of (ii) in the step of (b), the learning device performs or supports another device to perform a process of calculating (b-1) (i) a first vector from a center of the 2D bounding box to determine an end point of the first vector as a center of a first target 2D box which corresponds to a first surface of the pseudo-3D box, and (ii) a second vector from the center of the 2D bounding box to determine an end point of the second vector as a center of a second target 2D box which corresponds to a second surface, which is antipodal to the first surface, of the pseudo-3D box, by referring to the pseudo-3D orientation of the object; (b-2) respective ratios of (i) a width of the first target 2D box to a width of the 2D bounding box, (ii) a width of the second target 2D box to the width of the 2D bounding box, (iii) a height of the first target 2D box to a height of the 2D bounding box, and (iv) a height of the second target 2D box to the height of the 2D bounding box; and (b-3) coordinates of P5, P6, P7, and P8 which are vertices of the first target 2D box, and coordinates of P1, P2, P3, and P4 which are vertices of the second target 2D box, by referring to the displacements and the ratios, wherein the P8 is a vertex of the 2D bounding box and the P1 is a vertex of the 2D bounding box diagonal to the P8, and wherein the P4 and the P5 are not in contact with line segments of the 2D bounding box.

2. The method of claim 1, wherein, at the process of (ii) in the step of (b), the learning device determines or supports another device to determine a vertex V1 and its diagonal vertex V2 of the 2D bounding box as two vertices P1 and P8 of the pseudo-3D box, and calculates the displacements of two vertices P4 and P5 which are not in contact with line segments of the 2D bounding box by referring to the pseudo-3D orientation of the object, wherein the displacements are parallel to the line segments of the 2D bounding box.

3. The method of claim 1, wherein, at the process of (i) in the step of (b), the patterns of pseudo-3D orientation are stored in a database and retrieved to estimate the probabilities.

4. The method of claim 1, wherein, the learning device includes a CNN (convolutional neural network), and wherein the learning device performs or supports another device to perform (i) a process of acquiring and manipulating the training image to produce at least one feature map by using at least one convolutional layer, (ii) a process of determining an area corresponding to the 2D bounding box in the feature map and a process of extracting a feature vector from the area by using at least one pooling layer, (iii) a process of determining the pseudo-3D orientation of the object from the inputted feature vector by using a first fully connected layer, and (iv) a process of determining the 2D coordinates of vertices of the pseudo-3D box by using a second fully connected layer, to thereby acquire the 2D coordinates of the vertices of the pseudo-3D box.

5. A method for acquiring a pseudo-3D box bounding an object in a test image, comprising steps of:
(a) a testing device acquiring or supporting another device to acquire the test image including an object for testing bounded by a 2D bounding box for testing, on condition that (i) a learning device acquires or supports another device to acquire a training image including an object for training bounded by a 2D bounding box for training; (ii) the learning device performs or supports another device to perform (ii-1) a process of classifying a pseudo-3D orientation of the object for training, by referring to information on probabilities corresponding to respective patterns of pseudo-3D orientation, and (ii-2) a process of acquiring 2D coordinates of vertices of the pseudo-3D box for training by using regression analysis; and (iii) the learning device adjusts or supports another device to adjust parameters thereof by backpropagating loss information determined by referring to at least one of (iii-1) differences between the acquired 2D coordinates of the vertices of the pseudo-3D box for training and 2D coordinates of ground truth corresponding to the pseudo-3D box for training, and (iii-2) differences between the classified pseudo-3D orientation for training and ground truth corresponding to the pseudo-3D orientation for training;
(b) the testing device performing or supporting another device to perform (i) a process of classifying a pseudo-3D orientation of the object for testing, by referring to information on probabilities corresponding to respective patterns of pseudo-3D orientation and (ii) a process of acquiring 2D coordinates of vertices of the pseudo-3D box for testing by using the regression analysis, wherein the testing device performs or supports another device to perform a process of calculating respective displacements from vertices of the 2D bounding box by using the regression analysis
wherein the 2D coordinates define 2D coordinates of vertices of the pseudo-3D box,
the object being a vehicle, and the pseudo-3D box being configured to contain the object in an autonomous driving application, and
at the process of (ii) in the step of (b), the testing device performs or supports another device to perform a process of calculating (b-1) (i) a displacement between a center of the 2D bounding box for testing and a first point to be used as a center of a first target 2D box which corresponds to a first surface of the pseudo-3D box for testing, and (ii) a displacement between the center of the 2D bounding box for testing and a second point to be used as a center of a second target 2D box which corresponds to a second surface, which is antipodal to the first surface, of the pseudo-3D box for testing; (b-2) respective ratios of (i) a width of the first target 2D box to a width of the 2D bounding box for testing, (ii) a width of the second target 2D box to the width of the 2D bounding box for testing, (iii) a height of the first target 2D box to a height of the 2D bounding box for testing, and (iv) a height of the second target 2D box to the height of the 2D bounding box for testing; and (b-3) coordinates of P5, P6, P7, and P8 which consist vertices of the first target 2D box, and coordinates of P1, P2, P3, and P4 which consist vertices of the second target 2D box, by referring to the displacements and the ratios, wherein the P8 is a vertex of the 2D bounding box for testing and the P1 is a vertex of the 2D bounding box for testing diagonal to the P8, wherein the P4 and the P5 are not in contact with line segments of the 2D bounding box for testing.

6. The method of claim 5, wherein, at the process of (ii) in the step of (b), the testing device determines or supports another device to determine a vertex V1 and its diagonal vertex V2 of the 2D bounding box for testing as two vertices P1 and P8 of the pseudo-3D box for testing, and calculates displacements for two vertices P4 and P5 which are not in contact with line segments of the 2D bounding box for testing by referring to the pseudo-3D orientation of the object for testing wherein the displacements are parallel to the line segments of the 2D bounding box for testing.

7. A learning device for acquiring a pseudo-3D box from a 2D bounding box in a training image, comprising:
a processor configured to
obtain the training image including an object bounded by the 2D bounding box; and
perform or support another device to perform (i) a process of classifying a pseudo-3D orientation of the object, by referring to information on probabilities corresponding to respective patterns of pseudo-3D orientation; (ii) a process of acquiring 2D coordinates of vertices of the pseudo-3D box by using regression analysis, wherein the processor performs or supports another device to perform a process of calculating respective displacements from vertices of the 2D bounding box by using the regression analysis; and (iii) a process of adjusting parameters thereof by backpropagating loss information determined by referring to at least one of (iii-1) differences between the acquired 2D coordinates of the vertices of the pseudo-3D box and 2D coordinates of ground truth corresponding to the pseudo-3D box, and (iii-2) differences between the classified pseudo-3D orientation and ground truth corresponding to the pseudo-3D orientation,
wherein the 2D coordinates define 2D coordinates of vertices of the pseudo-3D box,
the object being a vehicle, and the pseudo-3D box being configured to contain the object in an autonomous driving application, and
the processor performs or supports another device to perform a process of calculating (i) a first vector from a center of the 2D bounding box to determine an end point of the first vector as a center of a first target 2D box which corresponds to a first surface of the pseudo-3D box, and (ii) a second vector from the center of the 2D bounding box to determine an end point of the second vector as a center of a second target 2D box which corresponds to a second surface, which is antipodal to the first surface, of the pseudo-3D box by regression; respective ratios of (i) a width of the first target 2D box to a width of the 2D bounding box, (ii) a width of the second target 2D box to the width of the 2D bounding box, (iii) a height of the first target 2D box to a height of the 2D bounding box, and (iv) a height of the second target 2D box to the height of the 2D bounding box by the regression; and coordinates of P5, P6, P7, and P8 which consist vertices of the first target 2D box, and coordinates of P1, P2, P3, and P4 which consist vertices of the second target 2D box, by referring to the displacements and the ratios, wherein the P8 is a vertex of the 2D bounding box and the P1 is a vertex of the 2D bounding box diagonal to the P8, and wherein the P4 and the P5 are not in contact with line segments of the 2D bounding box.

8. The learning device of claim 7, wherein the processor determines or supports another device to determine a vertex V1 and its diagonal vertex V2 of the 2D bounding box as two vertices P1 and P8 of the pseudo-3D box, and calculates or supports another device to calculate the displacements for two vertices P4 and P5 which are not in contact with line segments of the 2D bounding box by referring to the pseudo-3D orientation of the object by using the regression analysis, and wherein the displacements are parallel to the line segments of the 2D bounding box.

9. The learning device of claim 7, wherein the patterns of pseudo-3D orientation are stored in a database and retrieved to estimate the probabilities.

10. The learning device of claim 7, wherein the learning device includes a CNN (convolutional neural network), and wherein the processor performs or supports another device to perform (i) a process of acquiring and manipulating the training image to produce at least one feature map by using at least one convolutional layer, (ii) a process of determining an area corresponding to the 2D bounding box in the feature map and a process of extracting a feature vector from the area by using at least one pooling layer, and (iii) a process of determining the pseudo-3D orientation of the object from the inputted feature vector by using at least one first fully connected layer, and determining the 2D coordinates of vertices of the pseudo-3D box by using at least one second fully connected layer, to thereby acquire the 2D coordinates of the vertices of the pseudo-3D box.

11. The learning device of claim 7, wherein, the process of classifying the pseudo-3D orientation of the object is performed prior to the process of acquiring the 2D coordinates of vertices of the pseudo-3D box.

12. A testing device for acquiring a pseudo-3D box bounding an object in a test image, comprising:
a processor configured to
obtain the test image including an object for testing bounded by a 2D bounding box for testing, on condition that (i) a learning device acquires or supports another device to acquire a training image including an object for training bounded by a 2D bounding box for training; (ii) the learning device performs or supports another device to perform (ii-1) a process of classifying a pseudo-3D orientation of the object for training, by referring to information on probabilities corresponding to respective patterns of pseudo-3D orientation and (ii-2) a process of acquiring 2D coordinates of vertices of the pseudo-3D box for training by using regression analysis, wherein the processor performs or supports another device to perform a process of calculating respective displacements from vertices of the 2D bounding box by using the regression analysis; and (iii) the learning device adjusts or supports another device to adjust parameters thereof by backpropagating loss information determined by referring to at least one of (iii-1) differences between the acquired 2D coordinates of the vertices of the pseudo-3D box for training and 2D coordinates of ground truth corresponding to the pseudo-3D box for training, and (iii-2) differences between the classified pseudo-3D orientation for training and ground truth corresponding to the pseudo-3D orientation for training; and
perform or support another device to perform (i) a process of classifying a pseudo-3D orientation of the object for testing, by referring to information on probabilities corresponding to respective patterns of pseudo-3D orientation and (ii) a process of acquiring 2D coordinates of vertices of the pseudo-3D box for testing, by using the regression analysis,
wherein the 2D coordinates define 2D coordinates of vertices of the pseudo-3D box,
the object being a vehicle, and the pseudo-3D box being configured to contain the object in an autonomous driving application, and
the processor performs or supports another device to perform a process of calculating (i) a first vector from a center of the 2D bounding box for testing to determine an end point of the first vector as a center of a first target 2D box for testing which corresponds to a first surface of the pseudo-3D box for testing, and (ii) a second vector from the center of the 2D bounding box for testing to determine an end point of the second vector as a center of a second target 2D box for testing which corresponds to a second surface, which is antipodal to the first surface, of the pseudo-3D box for testing; and respective ratios of (i) a width of the first target 2D box for testing to a width of the 2D bounding box for testing, (ii) a width of the second target 2D box for testing to the width of the 2D bounding box for testing, (iii) a height of the first target 2D box for testing to a height of the 2D bounding box for testing, and (iv) a height of the second target 2D box for testing to the height of the 2D bounding box for testing, and coordinates of P5, P6, P7, and P8 which are vertices of the first target 2D box for testing, and coordinates of P1, P2, P3, and P4 which are vertices of the second target 2D box for testing, by referring to the displacements and the ratios, wherein the P8 is a vertex of the 2D bounding box for testing and the P1 is a vertex of the 2D bounding box for testing diagonal to the P8, and wherein the P4 and the P5 are not in contact with line segments of the 2D bounding box for testing.

13. The testing device of claim 12, wherein the processor determines or supports another device to determine a vertex V1 and its diagonal vertex V2 of the 2D bounding box for testing as two vertices P1 and P8 of the pseudo-3D box for testing, and calculates displacements of two vertices P4 and P5 which are not in contact with line segments of the 2D bounding box for testing by referring to the pseudo-3D orientation of the object for testing, wherein the displacements are parallel to the line segments of the 2D bounding box for testing.

* * * * *